United States Patent
Gershfield et al.

(10) Patent No.: US 6,578,029 B2
(45) Date of Patent: *Jun. 10, 2003

(54) SYSTEM AND METHOD FOR SELECTIVELY DEFINING ACCESS TO APPLICATION FEATURES

(75) Inventors: James N. Gershfield, Oradell, NJ (US); Shawn G. Barger, Parsippany, NJ (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/164,511

(22) Filed: Jun. 6, 2002

(65) Prior Publication Data

US 2003/0050913 A1 Mar. 13, 2003

Related U.S. Application Data

(63) Continuation of application No. 09/118,621, filed on Jul. 17, 1998, now Pat. No. 6,430,549.

(51) Int. Cl.[7] .............................................. G06F 17/30
(52) U.S. Cl. ................................ 707/2; 707/200; 707/1
(58) Field of Search .............................. 707/2, 200, 9, 707/201, 1; 709/225, 229; 370/254

(56) References Cited

U.S. PATENT DOCUMENTS

| 5,724,578 A | 3/1998 | Morinaga et al. ............ 395/611 |
| 6,061,684 A | 5/2000 | Glasser et al. ................. 707/9 |
| 6,064,656 A | 5/2000 | Angal et al. ................. 370/354 |
| 6,085,191 A | 7/2000 | Fisher et al. .................... 707/9 |
| 6,131,120 A | 10/2000 | Reid ........................... 709/225 |
| 6,161,139 A | 12/2000 | Win et al. .................... 709/225 |
| 6,182,142 B1 | 1/2001 | Win et al. .................... 709/229 |
| 6,202,066 B1 | 3/2001 | Baakley et al. ................. 709/9 |
| 6,430,549 B1 * | 8/2002 | Gershfield et al. ............. 707/2 |

FOREIGN PATENT DOCUMENTS

| GB | 2 301912 | 12/1996 | ............. G06F/1/00 |
| WO | 95/22792 A | 8/1995 | ............. G06F/1/00 |
| WO | 97/49211 | 12/1997 | ............. H04K/1/00 |

OTHER PUBLICATIONS

Information Week, Jun. 22, 1998, pp. 54–60, Davis, B., entitled *"Sign On Here"*.

Oracle 7™ Server Administrator's Guide, Release 7.3, Feb. 1996, Chapter 20, pp. 20–1 through 20–26, entitled *"Managing User Privileges and Roles"*.

* cited by examiner

Primary Examiner—Sanjiv Shah
(74) Attorney, Agent, or Firm—Baker Botts LLP

(57) ABSTRACT

A method and system are described for defining a user's access to one or more features of an application. One or more "attributes" are assigned to users of a computer system and stored in a data table. Each attribute has a name which designates the feature to which access is being defined, (e.g., the ability to access data within the database), and a value defining the limits of access. Attributes may be assigned in groups to eliminate the burden of preparing attribute assignments one by one for each user. When an application is run, the attributes are retrieved and enforced such that the user's access to the features of the application is defined in accordance with the retrieved attributes.

28 Claims, 2 Drawing Sheets

SYSTEM AND METHOD FOR SELECTIVELY DEFINING ACCESS TO APPLICATION FEATURES

RELATED APPLICATIONS

This application is a continuation of U.S. patent application Ser. No. 09/118,621, filed Jul. 17, 1998, now U.S. Pat. No. 6,430,549.

TECHNICAL FIELD OF INVENTION

The following invention relates generally to defining user access to computer systems, and in particular, to the ability to define selectively and flexibly the limits of each of a plurality of users' access to the features of one or more applications capable of being run on a computer system.

BACKGROUND OF INVENTION

In an environment such as a shared-resource service bureau environment, where many employees and/or clients have access to a computer system capable of running numerous applications, it is often desirable to have the ability to restrict access by certain users or classes of users to one or more features of such applications. As used herein, the term "features" includes any of the nearly infinite possible application functions such as, by way of example, accessing data from database tables, generating, viewing and printing reports, and sending and/or receiving e-mail.

Presently, such flexibility in restricting user access is unavailable. With respect to restricting access to data, one method presently employed by Oracle® Corporation in its database programs is to limit, at the database level, a user's ability to access particular data tables. Oracle® Corporation accomplishes this by providing for the assignment of "roles" to users which restrict access, not specifically to the data itself, but to the tables holding the data.

The need for more flexibility in restricting access to application features, including the data access feature restricted by the Oracle® roles, can be illustrated by a simple example. The following is a hypothetical data table of confidential financial transactions made by clients A, B and C on the morning of Jun. 15, 1998, where WDRWL indicates a withdrawal, DPST indicates a deposit, and PYMNT indicates a payment.

TABLE 1

|   | Client | Time | Type | Amount |
|---|--------|------|------|--------|
| 1 | A | 9:15 A | WDRWL | 1000.00 |
| 2 | B | 9:17 A | DPST | 2500.00 |
| 3 | B | 9:24 A | DPST | 1750.00 |
| 4 | A | 9:35 A | PYMNT | 5000.00 |
| 5 | C | 10:02 A | WDRWL | 50.46 |
| 6 | A | 10:41 A | DPST | 106.08 |
| 7 | C | 10:47 A | PYMNT | 530.06 |

In order to prepare a report regarding the confidential transactions of only client A for the month of June, one needs access to the data in rows 1, 4 and 6, but not rows 2, 3, 5 and 7. Since this data is highly sensitive, restriction of access to the data pertinent only to the assignment (i.e., reporting of client A's transactions) is highly desirable.

In addition, the application used to prepare a report of A's past transactions may have the ability to generate several different types of reports, including reports projecting future performance in addition to showing past performance. Depending on who is given the assignment, it may not be desirable to permit access to both types of report-generating abilities. It may also be undesirable to permit printing of the reports generated.

SUMMARY OF THE INVENTION

In accordance with the present invention, one or more "attributes" are assigned to users of a computer system capable of running numerous applications. Each attribute is a name-value pair wherein the name designates the application feature or features to which access is being defined (e.g., accessing data, generating reports) and the value sets the limits of access (e.g., all or some data). Attributes may be assigned in groups to eliminate the burden of preparing individual attribute assignments for each user.

In accordance with the invention, a system and method are provided for defining a user's ability to run at least one feature of an application. According to the system and method, a user is assigned at least one attribute. The attributes are stored in a table in a database. An application is run by the user and the attributes assigned to the user are retrieved. The attributes are enforced by the application such that the user's access to the features of the application is defined in accordance with the retrieved attributes.

In accordance with a further aspect of the invention, a system and method for defining a user's ability to run at least one feature of an application are provided wherein a group is assigned at least one attribute, and the group is assigned to a user. The group is stored in a table in a database. An application is run by the user and the group assigned to the user is retrieved. The attributes assigned to the group are enforced by the application such that the user's access to the features of the application is defined in accordance with the retrieved attributes.

It is therefore an object of the present invention to provide the ability to selectively define access to application features available to a given user or group of users of a computer system.

It is a further object of the present invention to provide greater flexibility than is presently available in the ability to restrict user access to data contained in table-oriented databases.

For a better understanding of the present invention, together with other and further objects, reference is made to the following description, taken in conjunction with the accompanying drawings and its scope will be pointed out in the appended claims.

DETAILED DESCRIPTION OF THE INVENTION

User Attributes

Figure 1:
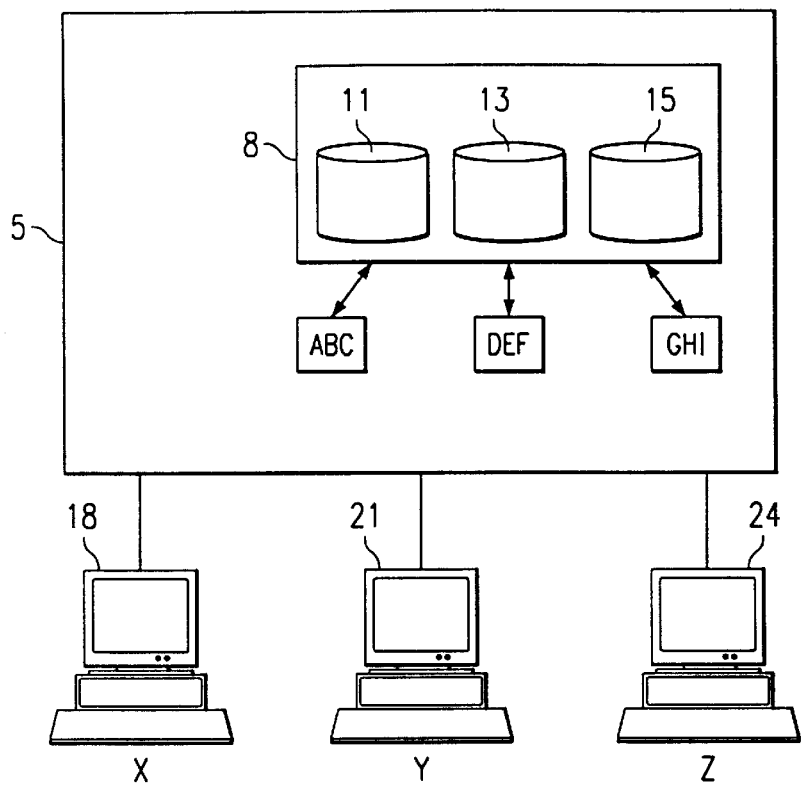
FIG. 1 is a block diagram depicting an exemplary system according to the present invention.

FIG. 1 is a block diagram depicting an exemplary system according to the present invention. A computer 5 runs database software 8 which maintains data tables represented by tables 11, 13 and 15. Numerous applications, represented by applications ABC, DEF and GHI, are also run on computer 5, some providing means for retrieving and manipulating the data in tables 11, 13 and 15. Each of the users of the system, X, Y and Z, has access to computer 5 via terminals, represented by computers 18, 21 and 24, respectively. According to the present invention, users X, Y and Z are assigned one or more "attributes." Each attribute has a name which designates an application feature to which access is being defined (e.g., the ability to access data within the database) and a value defining the limits of access, explained in greater detail below. Unless the context indicates otherwise, as used herein, the term attributes will be used to refer to a name-value pair.

Attributes are maintained in a table by database software 8, and define the users' respective abilities to run applications ABC, DEF and GHI. By way of example, two useful attributes are DATA_SCOPE and USER_LEVEL. DATA_SCOPE defines the data to which the user is permitted access, and, using Table 1 above as an example, has possible values of A, B, C or ALL which represent the data associated with clients A, B, C or all three clients, respectively. USER_LEVEL is a broad attribute which defines generally the level of access to the particular features of a given application which a user chooses to run. USER_LEVEL preferably has values of ADMIN, REGULAR and RESTRICTED, where ADMIN is the least restrictive, granting access to all available features of a particular application, e.g., report retrieval, e-mail, printing. RESTRICTED limits users to the most basic application features, e.g., report generation. REGULAR level users are permitted access to fewer features than ADMIN level users, but more than RESTRICTED level users. Each application can interpret the USER_LEVEL attribute based on the different features it provides. It will be understood that several narrowly focused attributes, e.g., relating to report generation or printing, may be used in lieu of the USER_LEVEL attribute.

The two attributes DATA_SCOPE and USER_LEVEL, and their respective values, are, of course, only examples. One skilled in the art will appreciate the unlimited potential for defining attributes limiting access to application features.

Grouping

Figure 2:
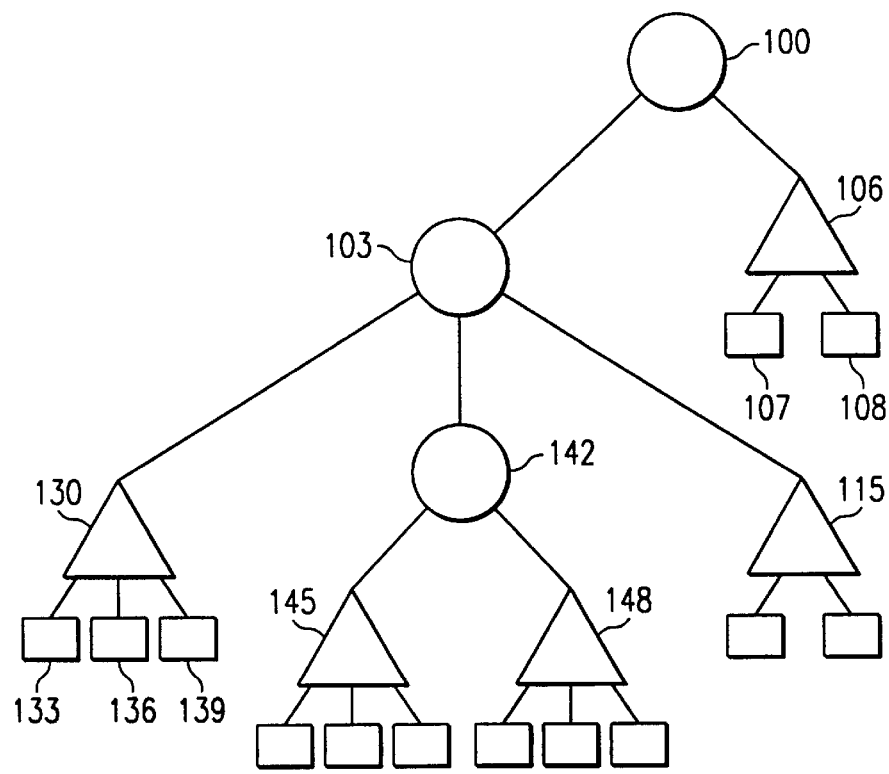
FIG. 2 is a block diagram depicting an example of the user attributes system grouping scheme of the present invention.

Attributes may be assigned to users individually, or, in a preferred embodiment, a grouping scheme may be implemented, an example of which is illustrated in FIG. 2. Attributes such as DATA_SCOPE and USER_LEVEL are represented by squares, "attribute groups" are represented by triangles and "assignee groups" are represented by circles. Attribute groups consist only of attributes and their values, while assignee groups consist of attribute groups and/or other assignee groups, but not individual attributes. In a preferred embodiment of the grouping scheme, each attribute group is limited to attributes for a single application, thereby providing the ability to assign different attributes and values for different applications. In an alternative embodiment, attribute groups may be created independent of particular applications such that one group may contain attributes for all applications. Although providing less flexibility in defining access to features of individual applications, such a system would be simpler to implement.

In the preferred embodiment, a table APPS, which contains at least one column called APP_CODE, defines the list of valid applications that may have associated attributes. With reference back to FIG. 1, the valid APP_CODE values in this example are ABC, DEF and GHI. Other columns in the APPS table would contain whatever information that is needed by each of the applications. For example, in a menuing system which provides icons from which a user chooses an application to run, a column APP_NAME would contain the character string that is used as the visible label of the icon associated with the application in the APP_CODE column.

Each attribute group defines a set of zero or more attributes for a specific application identified by an APP_CODE. An attribute group of zero attributes could be used to indicate that default values for the attributes should be assigned for that application. Typically, the default values will be the most restrictive. Alternatively, an attribute group of zero attributes could be used to indicate that there are no features of the application identified by the APP_CODE to which access is to be defined other than the ability to run the application.

The grouping example of FIG. 2 depicts a more complex user structure than the example previously under discussion in connection with FIG. 1 and Table 1. The attribute groups 106, 115, 130, 145 and 148 of FIG. 2 have attributes assigned as follows:

TABLE 2

| Attribute Group | Application | Attribute Name | Attribute Value |
| --- | --- | --- | --- |
| 106 | GHI | DATA_SCOPE | ALL |
|  |  | USER_LEVEL | ADMIN |
| 115 | DEF | DATA_SCOPE | ALL |
|  |  | USER_LEVEL | REGULAR |
| 130 | ABC | DATA_SCOPE | A |
|  |  | DATA_SCOPE | B |
|  |  | USER_LEVEL | REGULAR |
| 145 | ABC | DATA_SCOPE | A |
|  |  | DATA_SCOPE | B |
|  |  | USER_LEVEL | RESTRICTED |
| 148 | DEF | DATA_SCOPE | B |
|  |  | DATA_SCOPE | C |
|  |  | USER_LEVEL | RESTRICTED |

In this preferred embodiment, the application to which each attribute group applies is specified at the time the group is created, and, in the example under discussion, is indicated in the above Table 2 in the second column.

Returning to FIG. 2, a user assigned attribute group 106 will have attributes DATA_SCOPE 107 and USER_LEVEL 108 with values of ALL and ADMIN, respectively, as shown in Table 2. According to the attributes, the user should be permitted ADMIN access to application GHI and will be granted access to data relating to each of clients A, B and C when running that application. A user assigned attribute group 130 will have three attributes DATA_SCOPE 133, DATA_SCOPE 136 and USER_LEVEL 139 with values of A, B and REGULAR, respectively. According to the attributes, this user will be able to access data relating to clients A or B and will be able to access the features of application ABC which are pre-defined for a user of REGULAR status. A user assigned attribute group 145 will have RESTRICTED access to application ABC and will be granted access to data relating to clients A and B. A user assigned attribute group 148 will be permitted RESTRICTED access to application DEF and will be granted access to data relating to clients B and C.

One or more attribute groups can be assigned to assignee groups. In FIG. 2, assignee group 142, for example, may consist of attribute groups 145 and 148 and may include all of the attribute name-value pairs listed in the last two columns of the following Table 3:

TABLE 3

| Assignee Group | Attribute Group | Application | Attribute Name | Attribute Value |
|---|---|---|---|---|
| 142 | 145 | ABC | DATA_SCOPE | A |
|  |  |  | DATA_SCOPE | B |
|  |  |  | USER_LEVEL | RESTRICTED |
|  | 148 | DEF | DATA_SCOPE | B |
|  |  |  | DATA_SCOPE | C |
|  |  |  | USER_LEVEL | RESTRICTED |

Assignee groups can also be assigned to other assignee groups. This is illustrated in FIG. 2 by assignee group 103, which includes all attributes in assignee group 142 as well as all attributes in attribute groups 130 and 115. Assignee group 100 at the top of the figure consists of assignee group 103 and attribute group 106. Assignee group 100, therefore, contains all attributes in each of the five attribute groups 130, 145, 148, 115 and 106.

The attribute grouping system is particularly well-suited for assigning attributes to employees of differing levels of responsibility. For example, attribute groups 115, 130, 145 and 148 may be assigned to low- or mid-level employees, while assignee groups 100, 103 and 142 and attribute group 106 may be assigned to management personnel whose responsibility it is to oversee the work of the lower-level employees and, with respect to attribute group 106, run their own applications.

In this preferable grouping system, the assignment of attributes to attribute groups, assignee groups and users are kept in a table, ATTRIBUTES. The ATTRIBUTES table has three columns: ASSIGNEE, ATTRIBUTE_NAME and ATTRIBUTE_VALUE. ASSIGNEE may be an attribute group name, an assignee group name or a user. ATTRIBUTE_NAME is the name of the attribute (e.g., DATA_SCOPE). ATTRIBUTE_VALUE is a specific value for the named attribute (e.g., ALL).

The ATTRIBUTES table is maintained using seven basic commands. These exemplary commands are set forth below as Oracle® procedures for use in an Oracle® database environment. Those skilled in the art will appreciate that analogous commands may be derived for other environments. In the following descriptions, parameters are in single quotes and literal strings are in double quotes.

Command No. 1
  attr_utils.create_group ('group_name', 'group_type', 'app_code')
    'group_name': name of group
    'group_type': "ATTRIBUTE" or "ASSIGNEE"
    'app_code': if the 'group_type' is "ATTRIBUTE", this field is required; otherwise, it will be ignored
  This procedure will create a group of the specified type. It will exit with an error if the 'group_name' already exists as a group or an Oracle® user.
  According to the procedure, the 'group_name' and 'group_type' values are converted to upper case. Then, a record with the following column values is inserted in the ATTRIBUTES table:
    Set ASSIGNEE='group_name'
    Set ATTRIBUTE_NAME="ASSIGNEE_TYPE"
    Set ATTRIBUTE VALUE="ATTRIBUTE_GROUP" or "ASSIGNEE_GROUP" based on the value of 'group_type.'
  In addition, if the 'group_type' is "ATTRIBUTE", then another record with the following column values will be inserted into the ATTRIBUTES table:
    Set ASSIGNEE='group_name'
    Set ATTRIBUTE_NAME="APP_CODE"
    Set ATTRIBUTE_VALUE='app_code'.

Command No. 2
  attr_utils.assign_group ('assignee', 'group_name')
    'assignee': user or assignee group that will have the 'group_name' assigned.
    'group_name': group to be assigned to the assignee
  This procedure will assign one group to another group or user. An error will be returned if the 'assignee' doesn't exist as an assignee group or a user. An error will also be returned if the 'group_name' doesn't exist.
  This procedure will first convert the 'assignee' and 'group_name' values to upper case. Second, a record with the following column values is inserted into the ATTRIBUTES table:
    Set ASSIGNEE='assignee'
    Set ATTRIBUTE_NAME="ASSIGNED_GROUP"
    Set ATTRIBUTE_VALUE='group_name'.

Command No. 3
  attr_utils.assign_attribute ('assignee', 'attribute_name', 'attribute_value')
    'assignee': attribute group name. This must be an attribute group.
    'attribute_name': the name of the attribute
    'attribute_value': the value of the specified attribute
  This procedure will assign an attribute with the identified value to the 'assignee'. Errors will be returned if the assignee doesn't exist as an attribute group or if the attribute_name is reserved.
  This procedure will first convert the 'assignee' and 'attribute_name' values to upper case, and then insert a record with the following column values into the ATTRIBUTES table:
    Set ASSIGNEE='assignee'
    Set ATTRIBUTE_NAME='attribute_name'
    Set ATTRIBUTE_VALUE='attribute_value'.

Command No. 4
  attr_utils.drop_group ('group_name')
    'group_name': name of group or user that will be deleted along with all references to this group or user.
  This procedure will drop a group or user along with all references to the group or user. An error will be returned if the 'group_name' does not exist.
  This procedure will first convert the 'group_name' value to upper case and then delete all records in the ATTRIBUTES table in which the value in the ASSIGNEE column matches 'group_name'. In addition, all records in the ATTRIBUTES table which match both of the following criteria will be deleted:
    a. The value in the ATTRIBUTE_NAME column is "ASSIGNED_GROUP".
    b. The value in the ATTRIBUTE_VALUE column matches the 'group name'.

Command No. 5
  attr_utils.rescind_group ('assignee', 'group_name')
    'assignee': user or assignee group that will have the group_name rescinded
    'group_name': group to be rescinded from the assignee
  This procedure will rescind the specified 'group_name' from the 'assignee'. Errors will be returned if the 'group_name' or 'assignee' do not exist.
  This procedure will first convert 'assignee' and 'group_name' to upper case and then delete all records in the ATTRIBUTES table which match the following three criteria:

a. the value in the ATTRIBUTE_NAME column is "ASSIGNED GROUP".

b. the value in the ATTRIBUTE_VALUE column matches the 'group_name'.

c. the value in the ASSIGNEE column matches the 'assignee'.

Command No. 6 attr_utils.rescind_attribute ('assignee', 'attribute_name')

'assignee': attribute group name. This must be an attribute group.

'attribute_name': the name of the attribute.

This procedure will rescind the specified 'attribute_name' from the 'assignee'. Errors will be returned if the attribute_name or assignee do not exist or if the attribute_name is reserved.

NAMEs are used in the ATTRIBUTES table to identify specific information to be used within the system. An ATTRIBUTE_NAME of "APP_CODE" is automatically assigned to an attribute group to identify the application associated with that group. An ATTRIBUTE_NAME of "ASSIGNED_GROUP" is used to assign attributes to attribute groups, to assign attribute groups and assignee groups to assignee groups, and to assign attribute groups and assignee groups to users. An ATTRIBUTE_NAME of "ASSIGNEE_TYPE" is used to identify whether a group is an attribute group or an assignee group. The procedures will validate any ATTRIBUTE_NAME parameters to verify that they are not reserved and will return an error if an attempt is made to use a reserved ATTRIBUTE_NAME.

By way of example, the portion of the ATTRIBUTES table pertaining to assignee group 142 of FIG. 2 will appear as in the following Table 4:

TABLE 4

| ASSIGNEE | ATTRIBUTE_NAME | ATTRIBUTE_VALUE |
| --- | --- | --- |
| ASSIGNEE_GROUP_142 | ASSIGNEE_TYPE | ASSIGNEE_GROUP |
| ATTRIBUTE_GROUP_145 | ASSIGNEE_TYPE | ATTRIBUTE_GROUP |
| ATTRIBUTE_GROUP_145 | APP_CODE | ABC |
| ATTRIBUTE_GROUP_148 | ASSIGNEE_TYPE | ATTRIBUTE_GROUP |
| ATTRIBUTE_GROUP_148 | APP_CODE | ABC |
| ATTRIBUTE_GROUP_145 | DATA_SCOPE | A |
| ATTRIBUTE_GROUP_145 | DATA_SCOPE | B |
| ATTRIBUTE_GROUP_145 | USER_LEVEL | RESTRICTED |
| ATTRIBUTE_GROUP_148 | DATA_SCOPE | B |
| ATTRIBUTE_GROUP_148 | DATA_SCOPE | C |
| ATTRIBUTE_GROUP_148 | USER_LEVEL | RESTRICTED |
| ASSIGNEE_GROUP_142 | ASSIGNED_GROUP | ATTRIBUTE_GROUP_142 |
| ASSIGNEE_GROUP_142 | ASSIGNED_GROUP | ATTRIBUTE_GROUP_145 |

This procedure will first convert 'assignee' and 'attribute_name' to upper case and then delete all records in the ATTRIBUTES table which match both of the following criteria:

a. the value in the ASSIGNEE column matches 'assignee'.

b. the value in the ATTRIBUTE NAME column matches 'attribute_name'.

Command No. 7 attr_utils.update_attribute ('assignee', 'attribute_name', 'attribute_value')

'assignee': attribute group name. This must be an attribute group.

'attribute_name': the name of the attribute.

'attribute_value': the new value of the specified attribute.

This procedure will update the specified 'attribute_value' for the identified 'assignee' and 'attribute_name'. Errors will be returned if the attribute_name or assignee do not exist or if the attribute_name is reserved.

This procedure will first convert 'assignee' and 'attribute_name' to upper case, and then update the ATTRIBUTES table by setting the ATTRIBUTE_VALUE column to 'attribute_value' for all records which match both of the following criteria:

a. the value in the ASSIGNEE column matches 'assignee'.

b. the value in the ATTRIBUTE_NAME column matches 'attribute name'.

Using the foregoing commands, an ATTRIBUTES table is maintained. As shown in command numbers 1 and 2, in the preferred embodiment, several reserved ATTRIBUTE_

In the alternative embodiment of the invention, discussed above, where attribute groups are not limited to particular applications, the create_group procedure would not require an 'app_code' input, and APP_CODE attributes would not be maintained in the ATTRIBUTES table. Wholesale access to applications, however, could still be controlled using an additional table assigning APP_CODEs directly to users. If a user were not assigned a particular APP_CODE, the corresponding application would be completely unavailable to the user.

Parent-Child Hierarchy

The ability to assign to a single assignee group multiple attribute groups and/or assignee groups often results in the assignment to a group or user of overlapping, repetitive and even conflicting values for the same attribute. For example, assignee group 100, shown at the top of FIG. 2, includes every attribute in the figure, and therefore, as shown in Table 2 above, includes for the same application DEF different values B, C and ALL for the DATA_SCOPE attribute and different values REGULAR and RESTRICTED for the USER_LEVEL attribute. For this reason, in a preferred embodiment, attribute hierarchy rules are established wherein for each attribute value, a "parent value" is assigned, so that, for example, value B for the DATA_SCOPE attribute is assigned the parent value ALL. In practice, where a user's assigned attributes are called, and both a parent value and child value for the same attribute and application are present, the parent will be maintained and the child discarded. In addition, repetitive values will be discarded.

The parent-child assignments are maintained in a table ATTRIBUTE_LEVELS which has three columns:

ATTRIBUTE_NAME, CHILD_VALUE and PARENT_VALUE. ATTRIBUTE_NAME is the name of an attribute (e.g., DATA_SCOPE). CHILD_VALUE is an actual value of the attribute (e.g., C). PARENT_VALUE is the value of which the actual value is a subset (e.g., ALL). For the case where the actual attribute value is the highest in the hierarchy, for example ALL, the assigned parent value is NULL.

The ATTRIBUTE_LEVELS table is maintained using four basic commands. These exemplary commands are set forth below as Oracle® procedures for use in an Oracle® database environment. Those skilled in the art will appreciate that analogous commands may derived for other database environments. Note that in the following descriptions, parameters are in single quotes and literal strings are in double quotes.

Command No. 1
    attr_utils.add_attr_level ('attribute_name', 'child_value', 'parent_value')
        'attribute name': the name of the attribute
        'child_value': the child value for the specified 'attribute_name'
        'parent value': the parent value of the specified 'child_value' for the specified 'attribute_name'

This procedure will add a new attribute level for the specified parameters. The 'parent_value' can be "NULL" if the 'child_value' has the highest level of authority of the specified 'attribute_name'. Errors will be returned if the parent value is not null and does not exist.

This procedure first converts the 'attribute_name' to upper case, and then inserts a record with the following column values into the ATTRIBUTE_LEVELS table:
    Set ATTRIBUTE_NAME='attribute_name'
    Set CHILD_VALUE='child_value'
    Set PARENT_VALUE='parent_value'.

Command No. 2
    attr_utils.update_attr_level ('attribute_name', 'child_value', 'parent_value')
        'attribute name': the name of the attribute
        'child value': the child value for the specified attribute_name
        'parent_value': the parent value of the specified child value for the specified attribute name This procedure will update the parent value for the specified parameters. The 'parent_value' can be "NULL" if the 'child_value' has the highest level of authority of the specified 'attribute_name'. Errors will be returned if the parent value is not null and does not exist and if the attribute_name and child_value combination does not exist.

This procedure first converts the 'attribute_name' to upper case and then updates the ATTRIBUTE_LEVELS table by setting the PARENT_VALUE column value to 'parent_value' for all records which match both of the following criteria:
    a. the value in the ATTRIBUTE_NAME column matches 'attribute_name'.
    b. the value in the CHILD_VALUE column matches 'child_value'.

Command No. 3
    attr_utils.delete_attr_levels ('attribute_name', 'child_value')
        'attribute_name': the name of the attribute
        'child_value': the child value for the specified attribute_name This procedure will delete the attribute level and all children attribute levels for the specified parameters. Errors will be returned if the combination does not exist.

This procedure will first convert the 'attribute_name' to upper case and then delete all records in the ATTRIBUTE_LEVELS table which are "children" of the named pair of 'attribute_name' and 'child_value'. By way of example, the following SQL statement could be used to accomplish these first two steps:

DELETE ATTRIBUTE LEVELS
    WHERE (ATTRIBUTE_NAME, CHILD_VALUE) IN
    (SELECT ATTRIBUTE_NAME, CHILD_VALUE
    FROM ATTRIBUTE_LEVELS
    START WITH PARENT_VALUE=P_CHILD_VALUE
    AND ATTRIBUTE_NAME=UPPER(P_ATTRIBUTE_NAME) CONNECT BY PARENT_VALUE=PRIOR CHILD_VALUE AND ATTRIBUTE_NAME=PRIOR ATTRIBUTE_NAME).

This procedure will delete all records in the ATTRIBUTE_LEVELS table which match both of the following criteria:
    a. the value in the ATTRIBUTE_NAME column matches 'attribute_name'.
    b. the value in the CHILD_VALUE column matches 'child_value'.

Command No. 4
    attr_utils.delete_all_levels ('attribute_name')
        'attribute_name': the name of the attribute This procedure will delete all the attribute levels for the specified attribute_name. Errors will be returned if the attribute_name does not exist.

This procedure will first convert the 'attribute_name' to upper case and then delete all records in the ATTRIBUTE_LEVELS table in which the value in the ATTRIBUTE_NAME column matches 'attribute_name'.

Using the foregoing commands, an ATTRIBUTE_LEVELS table is maintained. By way of example, an ATTRIBUTE_LEVELS table for the sample attributes discussed above will appear as in the following Table 5:

TABLE 5

| ATTRIBUTE_NAME | CHILD_VALUE | PARENT_VALUE |
| --- | --- | --- |
| DATA_SCOPE | A | ALL |
| DATA_SCOPE | B | ALL |
| DATA_SCOPE | C | ALL |
| DATA_SCOPE | ALL | NULL |
| USER_LEVEL | RESTRICTED | REGULAR |
| USER_LEVEL | REGULAR | ADMIN |
| USER_LEVEL | ADMIN | NULL |

According to Table 5, any assignments of the DATA_SCOPE attribute having values A, B or C will be discarded if a DATA_SCOPE of ALL is assigned to the same user for the same application. Similarly, assignments of lower USER_LEVEL values will be discarded in favor of the highest value assigned.

Preferably, if an attribute value is assigned in the ATTRIBUTES table, but is not defined in the ATTRIBUTE_LEVELS table, then it will be treated as though it were defined in the ATTRIBUTE_LEVELS table with a parent value of NULL, and with no other value having the assigned value as its parent value.

Further minimization may be obtained by recognizing that a complete set of assigned values at a lower level can be replaced by the higher level value. For example, if DATA_SCOPE values of A, B and C are assigned, the system could return the value ALL. This minimization should be performed only if the complete set of lower level values actually represents the same thing as the higher level value, since it is possible that the higher level value might represent more than the sum of the lower level values.

Operation of the User Attributes System

Figure 3:
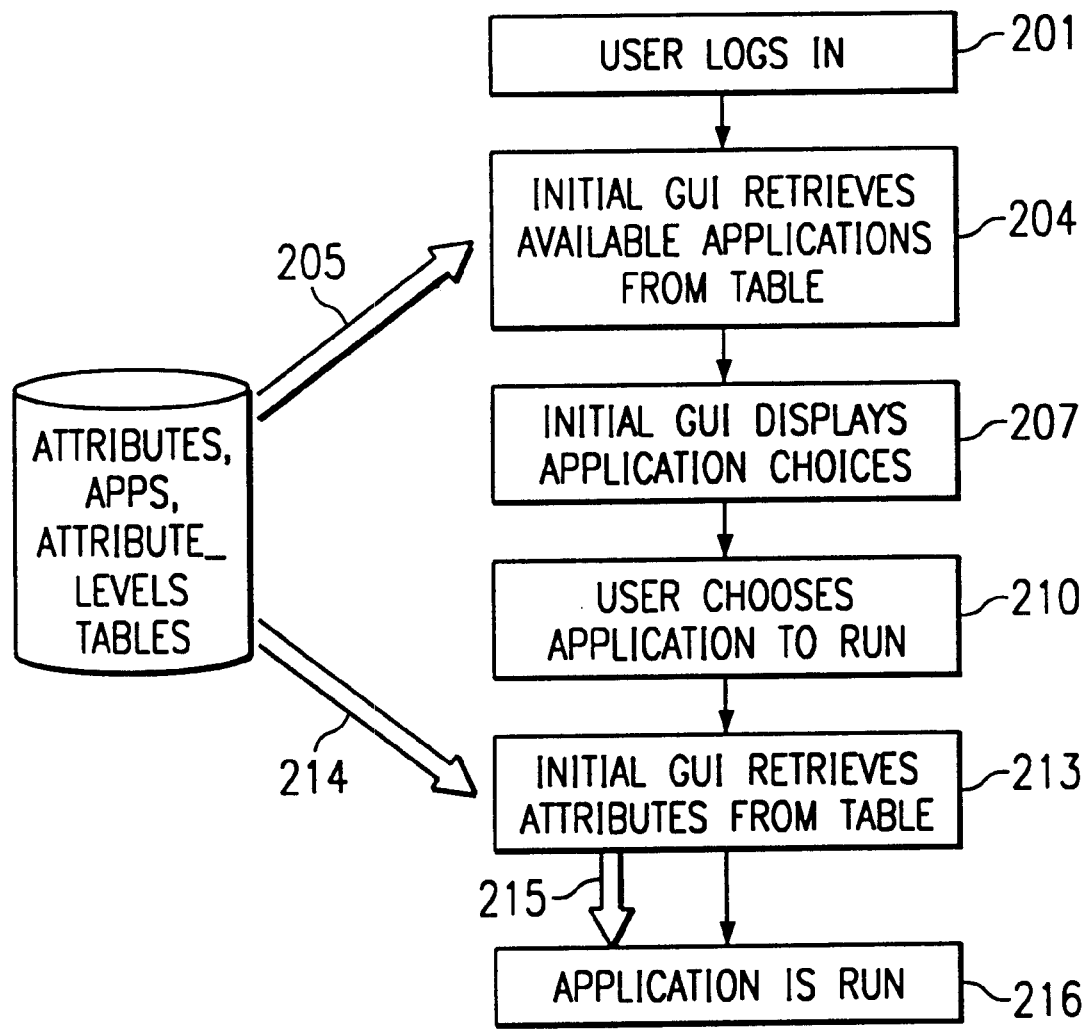
FIG. 3 is a flow diagram depicting one embodiment of the method of the present invention.

Reference to FIG. 3 will be made in connection with the following discussion of an exemplary use of the user attributes system of the present invention. According to a preferred embodiment of the invention, access to the applications being run in a database environment is controlled by an initial graphical user interface (IGUI). Examples of IGUIs include website home pages and local area network startup pages.

Prior to gaining access to the applications, however, a user typically logs in to a computer system, shown at box 201, at which time the computer system will recognize the user if the login is completed correctly. In box 204, the IGUI retrieves the applications available to the user. In the preferred embodiment, the IGUI does this by accessing the ATTRIBUTES table, at arrow 205, which contains the group assignments for the user. As discussed above, in the preferred embodiment, the group assignments include attribute group assignments which, in turn, include the specification of available applications. In an Oracle® database system, rather than search the entire ATTRIBUTES table which can be quite sizable, "views" containing the results of frequently-used searches (e.g., the attributes for a particular user) which is likely to be used over and over again may be prepared. In the alternative embodiment where attributes are not limited to specific applications, applications available to a particular user may be stored in and retrieved from a separate table.

At arrow 205, the IGUI will also access the APPS table of valid applications which contains an APP_CODE column to tell the IGUI what character string to display to the user in box 207, where the IGUI displays to the user the available applications. In box 210, the user chooses one of the available applications. In box 213, the IGUI accesses the ATTRIBUTES table, at arrow 214, and retrieves the user's attributes for the application chosen. Again, in an Oracle® database system, an Oracle® view may be used to retrieve the attributes. In addition, the IGUI may access the ATTRIBUTE_LEVELS table to reduce the number of attributes.

At arrow 215, the IGUI passes the relevant attributes to the application, and, in box 216, the application is run with the application enforcing the attributes. If the user attempts to exceed the limits of access as defined by the attributes, an error or warning may be posted.

It will be appreciated by those skilled in the art that, in an alternative embodiment, an application may retrieve the attributes directly, without the assistance of an IGUI, and enforce the attributes.

Views

As discussed above, Oracle® views may be used in the present invention to retrieve and organize records from tables. The following is a listing of twelve views found to be useful in the implementation of the invention. An explanation of each view and an SQL example is provided.

View No. 1
V_ATTRIBUTE_APP_CODES

This view will return a list of all distinct application codes setup in the user attributes system. This view performs a SELECT with the DISTINCT clause for records where the ATTRIBUTE_NAME is the reserved ATTRIBUTE_NAME of 'APP_CODE'.

SQL Example:
CREATE OR REPLACE VIEW V_ATTRIBUTE_APP_CODES AS
SELECT DISTINCT ASSIGNEE,
ATTRIBUTE_VALUE APP_CODE
FROM ATTRIBUTES
WHERE ATTRIBUTE_NAME='APP_CODE';

View No. 2
V_ATTRIBUTE_GROUPS_ATTR

This view will return a list of all distinct attribute groups. This view performs a SELECT with the DISTINCT clause for records where the ATTRIBUTE_NAME is the reserved ATTRIBUTE_NAME of 'ASSIGNEE_TYPE' and the ATTRIBUTE_VALUE is 'ATTRIBUTE_GROUP'.

SQL Example:
CREATE OR REPLACE VIEW V_ATTRIBUTE_GROUPS_ATTR
AS SELECT DISTINCT ASSIGNEE GROUP_NAME
FROM ATTRIBUTES
WHERE ATTRIBUTE_NAME='ASSIGNEE_TYPE'
AND ATTRIBUTE_VALUE='ATTRIBUTE_GROUP';

View No. 3
V_ATTRIBUTE_GROUPS_ASSIGN

This view will return a list of all distinct assignee groups. This view performs a SELECT with the DISTINCT clause for records where the ATTRIBUTE_NAME is the reserved ATTRIBUTE_NAME of 'ASSIGNEE_TYPE' and the ATTRIBUTE_VALUE is 'ASSIGNEE_GROUP'.

SQL Example:
CREATE OR REPLACE VIEW
V_ATTRIBUTE_GROUPS_ASSIGN AS
SELECT DISTINCT ASSIGNEE GROUP_NAME
FROM ATTRIBUTES
WHERE ATTRIBUTE_NAME='ASSIGNEE_TYPE'
AND ATTRIBUTE_VALUE='ASSIGNEE_GROUP';

View No. 4
V_ATTRIBUTE_USERS

This view will return a list of all distinct attribute users. This view performs a SELECT with the DISTINCT clause for records where the ASSIGNEE is equal to the USERNAME found in the Oracle Data Dictionary table ALL_USERS.

SQL Example:
CREATE OR REPLACE VIEW V_ATTRIBUTE_USERS AS
SELECT DISTINCT ASSIGNEE USERID
FROM ATTRIBUTES,
ALL_USERS
WHERE ASSIGNEE=USERNAME;

View No. 5
V_ATTRIBUTE GROUPS_ALL

This view will return a list of all distinct groups in the system. This includes both attribute and Assignee groups. This view performs a SELECT with the DISTINCT clause for records where the ASSIGNEE is not an attribute user.

SQL Example:
CREATE OR REPLACE VIEW V_ATTRIBUTE_GROUPS_ALL AS

```
SELECT DISTINCT ASSIGNEE GROUP_NAME
FROM ATTRIBUTES,
V_ATTRIBUTE_USERS
WHERE ASSIGNEE=USERID(+)
AND USERID IS NULL;
```

View No. 6

V_USER_GROUPS

This view will return a list of all groups assigned to the user currently connected to Oracle. The results include groups assigned directly to the user as well as groups indirectly assigned to the user. That is, groups that are assigned to ASSIGNEE GROUPS which are assigned to the user. This view performs a family tree type of query utilizing the CONNECT BY clause.

SQL Example:
```
CREATE OR REPLACE VIEW V_USER_GROUPS AS
SELECT ATTRIBUTE_NAME,
ATTRIBUTE_VALUE
FROM ATTRIBUTES
WHERE ATTRIBUTE_NAME !='ASSIGNEE_TYPE'
START WITH ASSIGNEE=USER
CONNECT BY ASSIGNEE=PRIOR ATTRIBUTE_VALUE
AND ATTRIBUTE_NAME='ASSIGNED_GROUP';
```

View No. 7

V_USER_ATTR_APPS

This view will return a list of all attributes assigned to the user currently connected to Oracle along with the corresponding APP_CODE. This view will combine the list of groups assigned to the user (V_USER_GROUPS), the ATTRIBUTES table, and the list of ATTRIBUTE_GROUPS with the corresponding APP_CODE values (V_ATTRIBUTE_APP_CODES).

SQL Example:
```
CREATE OR REPLACE VIEW V_USER_ATTR_APPS AS
SELECT ATTR.ATTRIBUTE_NAME,
ATTR.ATTRIBUTE_VALUE,
APPS.APP_CODE
FROM V_USER_GROUPS GROUPS,
ATTRIBUTES ATTR,
V ATTRIBUTE_APP_CODES APPS
WHERE GROUPS.ATTRIBUTE_VALUE=ATTR.ASSIGNEE
AND ATTR.ASSIGNEE=APPS.ASSIGNEE
AND ATTR.ATTRIBUTE_NAME NOT IN
('ASSIGNED_GROUP','APP_CODE','ASSIGNEE_TYPE');
```

View No. 8

V_USER_ATTR_HIGHEST_VALUES

This view will return a list of the highest level ATTRIBUTE_VALUEs for the corresponding ATTRIBUTE_NAMEs. This view may contain duplicate entries, so the V_USER_ATTRIBUTES view, discussed below, will retrieve a list of these distinct values. This view will pass the APP_CODE, ATTRIBUTE_NAME and ATTRIBUTE_VALUE for each attribute assigned to the current user to the function ATTR_UTILS.HIGHEST_VALUE. A function is the same as a procedure except that it can be executed as part of a query and will return a value.

Here, the function will return the highest parent value currently assigned to the user. A description of this function follows the SQL example for this view.

SQL Example:
```
CREATE OR REPLACE VIEW V_USER_ATTR_HIGHEST_VALUES AS
SELECT APP_CODE,
ATTRIBUTE_NAME,
SUBSTR( ATTR_UTILS.HIGHEST_VALUE(APP_CODE,
ATTRIBUTE_NAME, ATTRIBUTE_VALUE), 1, 30)
ATTRIBUTE_VALUE
FROM V_USER_ATTR_APPS;
```

The ATTR_UTILS.HIGHEST_VALUE function requires three inputs: the APP_CODE, ATTRIBUTE_NAME, and ATTRIBUTE_VALUE. The function will first load an internal attribute value table consisting of all attribute values assigned for the given user, APP_CODE and ATTRIBUTE_NAME. The function can use one of the existing views to do this (i.e., V_USER_ATTR_VALUE_LEVELS). The function will then use the current attribute value and find all of the parent records for this value. The function will use an SQL query that resembles the following:
```
SELECT PARENT_VALUE
FROM ATTRIBUTE_LEVELS
WHERE ATTRIBUTE_NAME=P_ATTRIBUTE_NAME
START WITH CHILD_VALUE=P_ATTRIBUTE_VALUE
CONNECT BY CHILD_VALUE=PRIOR PARENT_VALUE
ORDER BY LEVEL;
```

The function will then compare each parent value to the records in the attribute value table to determine whether one of the other assigned attribute values is a parent record, i.e., a parent, grandparent, etc., of the current attribute value. If so, the higher level attribute value is returned. Otherwise, the current attribute value is returned.

View No. 9

V_ATTR_VALUE_LEVELS

This view will return a list of ATTRIBUTE_NAMEs, the associated ATTRIBUTE_VALUEs, and the corresponding level of the value. For example, the highest level of an ATTRIBUTE_VALUE will have an ATTRIBUTE_LEVEL of 1, while that value's children will have values of 2. This view performs a family tree type of query utilizing the CONNECT BY clause.

SQL Example:
```
CREATE OR REPLACE VIEW V_ATTR_VALUE_LEVELS AS
SELECT ATTRIBUTE_NAME,
CHILD VALUE ATTRIBUTE_VALUE,
LEVEL VALUE_LEVEL
FROM ATTRIBUTE_LEVELS
START WITH PARENT_VALUE IS NULL
CONNECT BY PARENT_VALUE=PRIOR CHILD_VALUE
AND ATTRIBUTE_NAME=PRIOR ATTRIBUTE_NAME;
```

View No. 10

V_USER_ATTR_VALUE_LEVELS

This view will return a list of all attributes assigned to the user and their corresponding level. This view will combine the list of attributes assigned to the user currently connect to Oracle (V_USER_ATTR_APPS) and the list of attributes and their corresponding levels (V_ATTR_VALUE_LEVELS).

SQL Example:
```
CREATE OR REPLACE VIEW V_USER_ATTR_
   VALUE_LEVELS
AS SELECT APP_CODE,
ATTR.ATTRIBUTE_NAME,
ATTR.ATTRIBUTE_VALUE,
NVL(VALUE_LEVEL,1) VALUE_LEVEL
FROM V_USER_ATTR_APPS ATTR,
V_ATTR_VALUE_LEVELS LVL
WHERE
ATTR.ATTRIBUTE_NAME=LVL.ATTRIBUTE_
   NAME(+)
AND
ATTR.ATTRIBUTE_VALUE=LVL.ATTRIBUTE_
   VALUE(+);
```
View No. 11
V_USER_APP_CODES This view will return a list of all distinct APP_CODEs the current user has been assigned. This view performs a family tree type of query utilizing the CONNECT BY clause.

SQL Example:
```
CREATE OR REPLACE VIEW V_USER_APP_
   CODES AS
SELECT DISTINCT ATTR.ATTRIBUTE_VALUE
   APP_CODE
FROM (SELECT ATTRIBUTE_NAME,
ATTRIBUTE_VALUE
FROM ATTRIBUTES
START WITH ASSIGNEE=USER
CONNECT BY ASSIGNEE=PRIOR ATTRIBUTE_
   VALUE
AND ATTRIBUTE_NAME='ASSIGNED_GROUP')
   GROUPS,
ATTRIBUTES ATTR
WHERE GROUPS.ATTRIBUTE_VALUE=
   ATTR.ASSIGNEE
AND ATTR.ATTRIBUTE_NAME='APP_CODE';
```
View No. 12
USER
V_ATTRIBUTES This view will return a list of all of the attributes assigned to the user along with only the highest level ATTRIBUTE_VALUEs for the corresponding ATTRIBUTE_NAMEs. This view performs a SELECT DISTINCT on the V_USER_ATTR_HIGHEST_VALUES. (V_USER_ATTR_VALUE_LEVELS).

SQL Example:
```
CREATE OR REPLACE VIEW V_USER_
   ATTRIBUTES AS
SELECT DISTINCT
APP_CODE,
ATTRIBUTE_NAME,
ATTRIBUTE_VALUE
FROM V_USER_ATTR_HIGHEST_VALUES;
```

In an Oracle® environment, in order to ensure that the data in the ATTRIBUTES and ATTRIBUTE_LEVELS tables are maintained correctly, it is preferable that only the Oracle® procedures are used to perform any maintenance on user attributes. This can be guaranteed by limiting access to the different objects, e.g., tables, views, procedures and functions, in the user attributes system. Read-only authority should be given to the ATTRIBUTES and ATTRIBUTE_LEVELS tables, and to all of the views. Execute authority on the Oracle® procedures used to maintain these tables should be given only to the user attributes administrator(s). This will ensure that unauthorized users will not be able to manipulate attributes or attribute levels.

While this invention has been described with reference to several illustrative examples and embodiments, they should not be interpreted as limiting the scope or spirit of the attributes invention. In actual practice many modifications may be made by those of ordinary skill in the art without deviating from the scope of the invention as expressed in the appended claims.

We claim:

1. In a computer system capable of running at least one application and maintaining a database, each application having at least one feature, a method for defining a user's access to said at least one feature, comprising:

running an application having at least two features, one of the features relating to the ability to access data and one of the features relating to the ability to manipulate accessed data;

retrieving from a database two or more attributes assigned to a user, one of the retrieved attributes relating to the ability to access data and one of the retrieved attributes relating to the ability to manipulate accessed data; and enforcing the retrieved attributes, whereby the user's access to data and ability to manipulate accessed data is defined in accordance with the retrieved attributes.

2. The method of claim 1 wherein more than one of the at least two features relate to the ability to access data.

3. The method of claim 1 further comprising:

retrieving one or more parent-child value relationships from said database; and determining whether any of the retrieved attributes may be discarded in accordance with the retrieved parent-child value relationships.

4. The method of claim 1 further comprising, providing a user a choice of applications to run in accordance with the at least two attributes assigned to said user.

5. The method of claim 4 wherein the applications provide access to different data based on the same attribute.

6. In a computer system capable of running at least one application and maintaining a database, each application having at least one feature, a method for defining a user's access to said at least one feature, comprising:

assigning at least two attributes to a user, one of the attributes relating to the ability to access data and one of the attributes relating to the ability to manipulate accessed data;

running an application having at least two features, one of the features relating to the ability to access data and one of the features relating to the ability to manipulate accessed data; and enforcing the attributes, whereby the user's access to data and ability to manipulate accessed data is defined in accordance with the assigned attributes.

7. The method of claim 6 further comprising, providing to a user a choice of applications to run in accordance with the at least two attributes assigned to said user.

8. The method of claim 7 wherein the applications provide access to different data based on the same attribute.

9. The method of claim 6 wherein more than one of the at least two features relate to the ability to access data.

10. The method of claim 6 further comprising:

assigning a parent value for at least one actual value of said at least two attributes; and determining whether any of the retrieved attributes may be discarded in accordance with the retrieved parent-child value relationships.

11. In a computer system capable of running at least one application and maintaining a database, each application having at least one feature, a method for defining a user's access to said at least one feature, comprising:

running an application;

retrieving from a database at least one attribute assigned to a user and a parent-child value relationship for at least one of the attributes;

determining whether any of the retrieved attributes may be discarded in accordance with any of the retrieved parent-child value relationships; and enforcing the retrieved attributes, whereby the user's access to said at least one feature of said application is defined in accordance with the retrieved attributes.

12. The method of claim 11, wherein one or more of the at least one feature relates to the ability to access data.

13. The method of claim 11 further comprising, providing a user a choice of applications to run in accordance with the at least attribute assigned to the user.

14. The method of claim 13 wherein the applications provide access to different data based on the same attribute.

15. In a computer system capable of running at least one application and maintaining a database, each application having at least one feature, a method for defining a user's access to said at least one feature, comprising:

assigning at least one attribute to a user and a parent-child value relationship to at least one of the attributes;

running an application in said computer system;

determining whether any of the attributes may be discarded in accordance with any of the parent-child value relationships; and enforcing the assigned attributes, whereby the user's access to said at least one feature of said application is defined in accordance with the assigned attributes.

16. The method of claim 15, wherein one or more of the at least one feature relates to the ability to access data.

17. The method of claim 15 further comprising, providing a user a choice of applications to run in accordance with the at least attribute assigned to a user.

18. The method of claim 17 wherein the applications provide access to different data based on the same attribute.

19. In a computer system capable of running at least one application and maintaining a database, each application having at least one feature, a method for defining a user's access to said at least one feature, comprising:

running an application having a feature relating to the ability to manipulate accessed data;

retrieving from a database at least one attribute assigned to a user, at least one of the retrieved attributes relating to the ability to manipulate accessed data; and enforcing the retrieved attributes, whereby the user's ability to manipulate accessed data is defined in accordance with the retrieved attributes.

20. The method of claim 19 wherein the application has at least two features, one of the features relating to the ability to access data.

21. The method of claim 19 further comprising:

retrieving at least one parent-child value relationship from said database; and determining whether any of the retrieved attributes may be discarded in accordance with the retrieved parent-child value relationships.

22. The method of claim 19 further comprising providing a user a choice of applications to run in accordance with the attributes assigned to a user.

23. The method of claim 22 wherein the applications provide access to different data based on the same attribute.

24. In a computer system capable of running at least one application and maintaining a database, each application having at least one feature, a method for defining a user's access to said at least one feature, comprising:

assigning at least one attribute to a user, at least one of the attributes relating to the ability to manipulate accessed data;

running an application having a feature relating to the ability to manipulate accessed data; and enforcing the assigned attributes, whereby the user's ability to manipulate accessed data is defined in accordance with the assigned attributes.

25. The method of claim 24 wherein the application has at least two features, at least one of the features relating to the ability to access data.

26. The method of claim 24 further comprising:

assigning a parent value for at least one actual value of said at least one attribute, whereby one or more parent-child relationships are created; and determining whether any of the assigned attributes may be discarded in accordance with the assigned parent-child value relationships.

27. The method of claim 24 further comprising, providing to said user a choice of one or more applications to run in accordance with the at least two attributes assigned to said user.

28. The method of claim 27 wherein the applications provide access to different data based on the same attribute.

* * * * *